(12) United States Patent
Nakayama

(10) Patent No.: US 11,017,104 B2
(45) Date of Patent: May 25, 2021

(54) AUTHENTICATION SYSTEM, TERMINAL, AUTHENTICATION METHOD, AND NON-TRANSITORY COMPUTER-READABLE MEDIUM

(71) Applicant: Ryuichiro Nakayama, Kanagawa (JP)

(72) Inventor: Ryuichiro Nakayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/812,518

(22) Filed: Mar. 9, 2020

(65) Prior Publication Data
US 2020/0302070 A1 Sep. 24, 2020

(30) Foreign Application Priority Data
Mar. 18, 2019 (JP) .............................. JP2019-050318

(51) Int. Cl.
  *G06F 21/31* (2013.01)
  *G06F 21/60* (2013.01)
  *H04L 29/06* (2006.01)
  *H04N 1/00* (2006.01)

(52) U.S. Cl.
  CPC ............ *G06F 21/608* (2013.01); *G06F 21/31* (2013.01); *H04L 63/08* (2013.01); *H04N 1/00877* (2013.01)

(58) Field of Classification Search
None
See application file for complete search history.

(56) References Cited

U.S. PATENT DOCUMENTS

| 2011/0222103 A1 | 9/2011 | Doui |
| 2012/0262749 A1* | 10/2012 | Yamamoto ......... H04N 1/00424 358/1.14 |
| 2013/0182282 A1 | 7/2013 | Nakayama et al. |
| 2014/0082148 A1 | 3/2014 | Nakayama |

(Continued)

FOREIGN PATENT DOCUMENTS

| JP | 2005-173816 | 6/2005 |
| JP | 2008-059019 | 3/2008 |
| JP | 2016-177551 | 10/2016 |

OTHER PUBLICATIONS

Extended European Search Report dated Aug. 7, 2020 in European Patent Application No. 20160819.7, 8 pages.

*Primary Examiner* — Dov Popovici
(74) *Attorney, Agent, or Firm* — Oblon, McClelland, Maier & Neustadt, L.L.P.

(57) ABSTRACT

An authentication system includes: a terminal; and an information processing apparatus communicable with the terminal via a network, the authentication system being configured to perform authentication of a user who operates the information processing apparatus. The information processing apparatus includes one or more first processors configured to: accept user information for use in authentication of the user; accept terminal information for use in identification of the terminal; and identify the terminal based on the terminal information, to transmit the user information to the terminal. The terminal includes one or more second processors configured to: store a job designated by the user; receive the user information from the information processing apparatus; and perform authentication of the user based on the user information received.

13 Claims, 13 Drawing Sheets

(56) References Cited

U.S. PATENT DOCUMENTS

| | | |
|---|---|---|
| 2015/0277830 A1 | 10/2015 | Mukai |
| 2016/0124689 A1* | 5/2016 | Nishino ................ G06F 3/1238 358/1.14 |
| 2016/0212131 A1* | 7/2016 | Nishida .................. H04L 63/08 |
| 2018/0032298 A1* | 2/2018 | Murata ................ G06F 3/1268 |
| 2018/0032708 A1 | 2/2018 | Mori et al. |
| 2018/0136884 A1 | 5/2018 | Ikari |
| 2018/0270216 A1 | 9/2018 | Nakayama |
| 2018/0288279 A1 | 10/2018 | Kitai |

* cited by examiner

| USER ID | |
|---|---|
| | LOGIN |
| USER PASSWORD | |
| | |

| TERMINAL NAME | IP ADDRESS |
|---|---|
| AAA | 10.20.30.5 |
| AAB | 10.20.30.10 |
| AAC | 10.20.30.84 |
| AAD | 10.20.30.50 |

| JOB ID | DATA NAME |
|---|---|
| 1 | aaaaaa.jpg |
| 2 | bbbbbb.doc |
| 3 | cccccc.pdf |
| 4 | – |

AUTHENTICATION SYSTEM, TERMINAL, AUTHENTICATION METHOD, AND NON-TRANSITORY COMPUTER-READABLE MEDIUM

CROSS-REFERENCE TO RELATED APPLICATION

This patent application is based on and claims priority pursuant to 35 U.S.C. § 119(a) to Japanese Patent Application No. 2019-050318, filed on Mar. 18, 2019, the entire disclosure of which is incorporated herein by reference.

BACKGROUND

Technical Field

The present disclosure relates to an authentication system, a terminal, an authentication method, a non-transitory computer-readable medium.

Description of the Related Art

There is known a system that uses an authentication server to perform authentication of a user who operates an information processing apparatus such as a multifunction peripheral/printer/product (MFP).

There is a printing system in which a server apparatus, an information processing apparatus, and a client terminal are connected via a network. In such printing system, for example, the information processing apparatus transmits an authentication request of a user to the server apparatus. If authentication is successful, the information processing apparatus accumulates terminal information associated with the user in a cache unit. If the information processing apparatus does not acquire a response to the user authentication request from the server apparatus, the information processing apparatus acquires output data from the client terminal specified by the terminal information that is associated with the user and is accumulated in the cache unit.

SUMMARY

According to one or more embodiments, an authentication system includes: a terminal; and an information processing apparatus communicable with the terminal via a network, the authentication system being configured to perform authentication of a user who operates the information processing apparatus. The information processing apparatus includes one or more first processors configured to: accept user information for use in authentication of the user; accept terminal information for use in identification of the terminal; and identify the terminal based on the terminal information, to transmit the user information to the terminal. The terminal includes one or more second processors configured to: store a job designated by the user; receive the user information from the information processing apparatus; and perform authentication of the user based on the user information received.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is a diagram illustrating an example of a screen displayed on the information processing apparatus according to the first embodiment;

FIG. 8 is a diagram illustrating an example of a screen displayed on the information processing apparatus according to the first embodiment;

Figure 1:
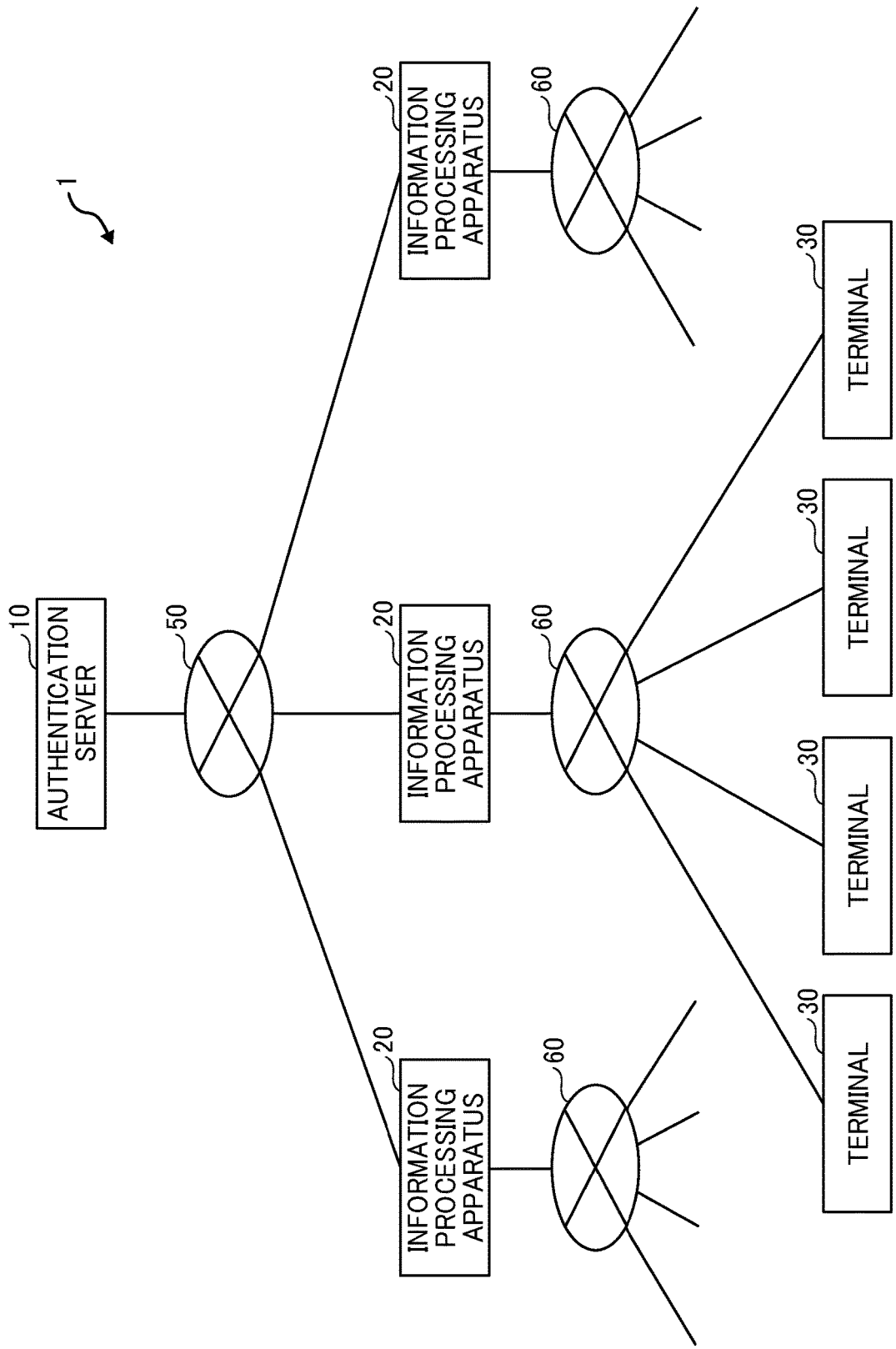
FIG. 1 is a diagram illustrating an example of a configuration of an authentication system according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure will be described below with reference to the accompanying drawings. Note that constituents having substantially the same functional configuration are denoted by the same reference sign in the specification and the drawings to omit a duplicate description.

First Embodiment

Configuration of Authentication System 1:

A configuration of an authentication system 1 according to a first embodiment will be described. FIG. 1 is a diagram illustrating an example of a configuration of the authentication system 1 according to the first embodiment. As illustrated in FIG. 1, the authentication system 1 includes an authentication server 10, information processing apparatuses 20, and terminals 30. In the present embodiment, the authentication system 1 performs authentication when the terminal 30 causes the information processing apparatus 20 to perform processing.

The authentication server 10 and the information processing apparatuses 20 communicate with each other. In the present embodiment, the authentication server 10 and the information processing apparatuses 20 communicate with each other via a first communication network 50. In addition, each of the information processing apparatuses 20 and the terminals 30 communicate with each other. In the present embodiment, each of the information processing apparatuses 20 and the terminals 30 communicate with each other via a second communication network 60.

In the authentication system 1, one or more information processing apparatuses 20 may be deployed for a single authentication server 10. Further, one or more terminals 30 may be deployed for a single information processing apparatus 20. For example, suppose that the authentication system 1 is installed, but not limited to, in a company. In such a case, the authentication server 10 is deployed in the headquarters, the head office, or the like, and the information processing apparatuses 20 and the terminals 30 are deployed in respective floors of a building of the headquarters, the head office, the branch office, a business office, or the like, or in respective departments. The authentication system 1 may include one or more authentication servers 10, one or more information processing apparatuses 20, and one or more terminals 30.

Each of the first communication network 50 and the second communication network 60 may be, for example, the Internet, an intranet, a wired local area network (LAN), a wireless LAN, a mobile communication network, a telephone-line communication network, or another network using wired or wireless communication. In the present embodiment, the first communication network 50 is, but not limited to, the Internet, and the authentication server 10 constitutes, but not limited to, a cloud server. The second communication network 60 is a wired LAN. The first communication network 50 and the second communication network 60 are different communication networks but may be the same communication network.

In addition, each apparatus among the authentication server 10, the information processing apparatuses 20, and the terminals 30 may include one or more apparatuses. In the case where the apparatus includes two or more apparatuses, the two or more apparatuses may be disposed in a single device or may be separately disposed in two or more discrete devices. In the specification and the claims, the term "apparatus" may mean not only a single apparatus but also a system including a plurality of apparatuses.

The authentication server 10 is an apparatus that has a communication function and that processes information. Examples of the authentication server 10 include a computer. The authentication server 10 holds user information or the like registered in the authentication system 1. Further, the authentication server 10 performs user authentication. For example, the authentication server 10 determines whether user information acquired from the information processing apparatus 20 or the like matches legitimate user information registered in the authentication system 1. If the user information matches the legitimate user information, the authentication server 10 admits that the user is a legitimate user, that is, authenticates the user. If the user information does not match the legitimate user information, the authentication server 10 admits that the user is not a legitimate user, that is, does not authenticate the user.

The authentication server 10 transmits an authentication result indicating whether the authentication is successful to the information processing apparatus 20 or the like. Note that the user may be any entity that can be registered in the authentication system 1. For example, examples of the user include a person, a group, an organization, and an apparatus. Herein, the authentication server 10 is an example of an authentication apparatus. Note that the authentication system 1 may have a configuration without an authentication apparatus.

Each of the information processing apparatuses 20 is an apparatus that has a communication function and that processes information. In the present embodiment, the description will be given on the assumption that the information processing apparatus 20 is an image forming apparatus. Note that the information processing apparatus 20 is not limited to an image forming apparatus and may be any apparatus that is connected to the authentication server 10 and the terminals 30.

The image forming apparatus is an apparatus that forms an image representing content of data or the like on a medium. Examples of the image forming apparatus include output apparatuses such as an MFP, a fax, a scanner, a printer, a projector (PJ), an interactive white board (IWB) that enables interactive communication and has an electronic whiteboard function, and a digital signage; a head-up display (HUD) device; and a display device. In the present embodiment, the description will be given on the assumption that the image forming apparatus is an MFP that forms an image on a recording medium and that has fax, scanner, and printer functions. That is, in the following description, the information processing apparatus 20 is an image forming apparatus that executes a job for forming an image on a recording medium on the basis of a print job. In the case where the information processing apparatus 20 is an image forming apparatus, to-be-processed data is, for example, print data or the like.

Examples of the recording medium include, but not limited to, a sheet material such as paper, cloth, film, or plate. In the present embodiment, it is assumed that the recording medium is paper. Therefore, the information processing apparatus 20 performs printing to form an image on paper.

Note that examples of the information processing apparatus 20, except for an image forming apparatus, include, industrial machinery, an imaging apparatus, a sound collector, medical equipment, a smart appliance, a connected car, a notebook personal computer (PC), a mobile phone, a smartphone, a tablet terminal, a game console, a personal digital assistant (PDA), a digital camera, a wearable PC, and a desktop PC.

Each of the terminals 30 is an apparatus that has a communication function and that processes information. The terminal 30 transmits to-be-processed data or the like representing an image to be formed on a recording medium to the information processing apparatus 20. The terminal 30 may generate the to-be-processed data or may acquire the to-be-processed data from an external device. In the present embodiment, the terminal 30 transmits the to-be-processed data to the information processing apparatus 20 via the second communication network 60. Examples of the terminal 30 include a notebook PC, a mobile phone, smart devices such as a smartphone and a tablet terminal, a game machine, a PDA, a digital camera, a wearable PC, a desktop PC, a videoconference terminal, and an IWB. In the present embodiment, the description will be given on the assumption that the terminal 30 is a notebook PC.

In the authentication system 1, the terminal 30 generates a print job including print data that is data of an image to be formed on a recording medium and temporarily holds the print job.

Figure 2:
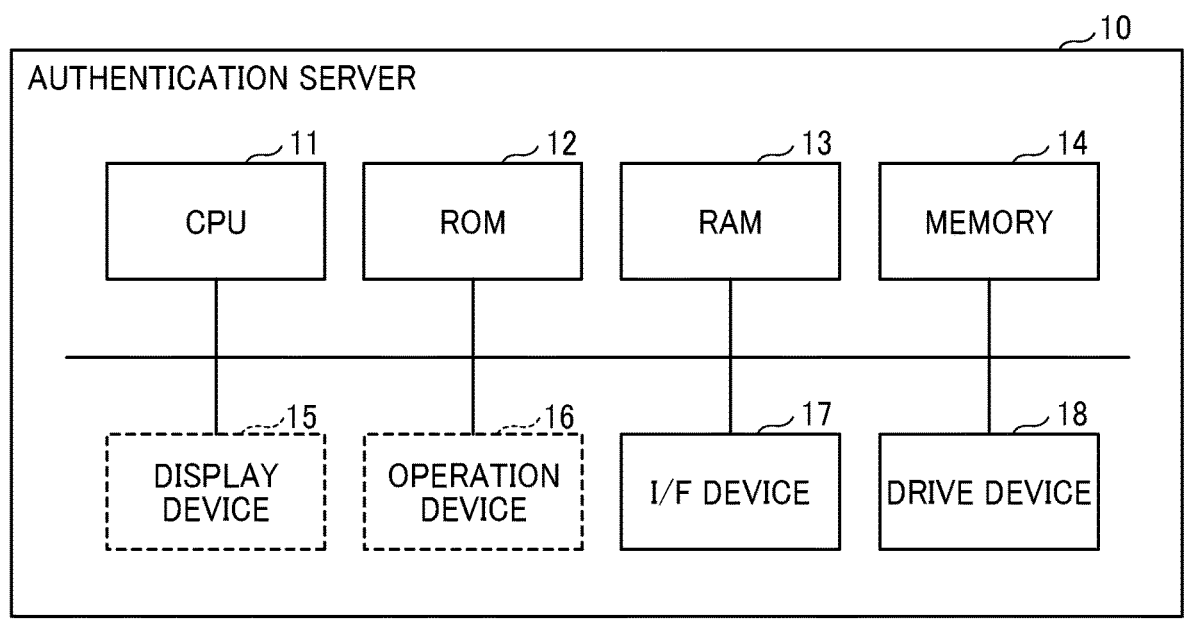
FIG. 2 is a block diagram illustrating an example of a hardware configuration of an authentication server according to the first embodiment.

Hardware Configuration of Authentication Server 10:

A hardware configuration of the authentication server 10 will be described. FIG. 2 is a block diagram illustrating an example of a hardware configuration of the authentication server 10 according to the first embodiment. As illustrated in FIG. 2, the authentication server 10 includes a central processing unit (CPU) 11, a read-only memory (ROM) 12, a random access memory (RAM) 13, a memory 14, a display device 15, an operation device 16, an interface (I/F) device 17, and a drive device 18 as constituents. The individual constituents are connected to each other through a bus, for example, but may be connected to each other via either wired communication or wireless communication. At least one of the constituents mentioned above is optional. For example, at least one of the display device 15 and the operation device 16 may be a device separate from the authentication server 10 and may be connected to the authentication server 10 with a cable or wirelessly.

The CPU 11 includes a processor or the like and controls operations of the individual constituents of the authentication server 10 and the entire operation of the authentication server 10. The ROM 12 includes a nonvolatile semiconductor storage device or the like and stores various programs that run on the authentication server 10 and various parameters. For example, the ROM 12 functions as a storage device that stores boot programs such as a basic input/output system (BIOS) and an extensible firmware interface (EFI), for example. The RAM 13 includes volatile semiconductor storage devices such as a dynamic random access memory (DRAM) and a static random access memory (SRAM), or the like. The RAM 13 is used as a work area for the CPU 11. The RAM 13 provides a storage area for temporarily storing data when various kinds of signal processing and image processing are performed.

The memory 14 enables storage of various kinds of information and retrieval of stored information. For example, the memory 14 stores various kinds of information such as data used by various programs. The memory 14 includes a storage device such as a volatile or nonvolatile semiconductor memory, a hard disk drive (HDD), or a solid state drive (SSD). Note that the memory 14 may include at least one of the ROM 12 and the RAM 13.

A program is held in the ROM 12, the memory 14, or the like in advance. The program is read from the ROM 12, the memory 14, or the like and loaded to the RAM 13 by the CPU 11. The CPU 11 executes each coded instruction in the program loaded to the RAM 13.

Note that the program may be stored on a storage medium such as a recording disc, for example, as well as the ROM 12 and the memory 14. For example, a distributed storage medium may be placed in the drive device 18, and various programs recorded on the storage medium may be read by the drive device 18. In addition, the program may be transmitted to the I/F device 17 via a wired network, a wireless network, broadcasting, or the like and may be loaded to the RAM 13 or the like.

Note that functions implemented by the CPU 11 described above may be implemented by a program execution unit of the CPU 11 or the like, by circuitry, or by a combination of the program execution unit and the circuitry. For example, such functions may be implemented by a large scale integration (LSI) chip which is an integrated circuit. Each of such functions may be implemented as a single chip separately, or a single chip may include some or all of such functions. As such an LSI chip, a field programmable gate array (FPGA) that is programmable after production of the LSI, a reconfigurable processor for which at least one of connections and settings of circuit cells in the LSI are reconfigurable, an application-specific integrated circuit (ASIC) to which circuits for a plurality of functions are integrated together for a specific application, or the like may be used.

The display device 15 displays various screens under the control of the CPU 11. The display device 15 may be a display of a liquid crystal panel, an organic electroluminescence (EL), an inorganic EL, or the like. The display device 15 may include a speaker for outputting sound. The display device 15 may be a touch panel that also functions as the operation device 16.

The operation device 16 is a device that accepts an operation input by a user. The operation device 16 may include an input device such as buttons, a dial, keys, a mouse, a touch panel, a microphone for sound input, or the like.

The I/F device 17 is a connection device for connecting the authentication server 10 to the first communication network 50 and other apparatuses. The I/F device 17 is connected to the information processing apparatuses 20 and other apparatuses via the first communication network 50. In addition, the I/F device 17 is connected to another apparatus via wired or wireless communication. In the present embodiment, the authentication server 10 and the information processing apparatuses 20 are connected to each other via the first communication network 50 but may be connected to each other via wired or wireless communication.

The drive device 18 is a device in which a storage medium is placed. The storage medium may be a medium, such as Compact Disc Read Only Memory (CD-ROM), a flexible disk, or a magneto-optical disk, on which information is recorded optically, electrically, or magnetically or may be a medium such as a semiconductor memory, such as a ROM or a flash memory, on which information is recorded electrically.

Figure 3:
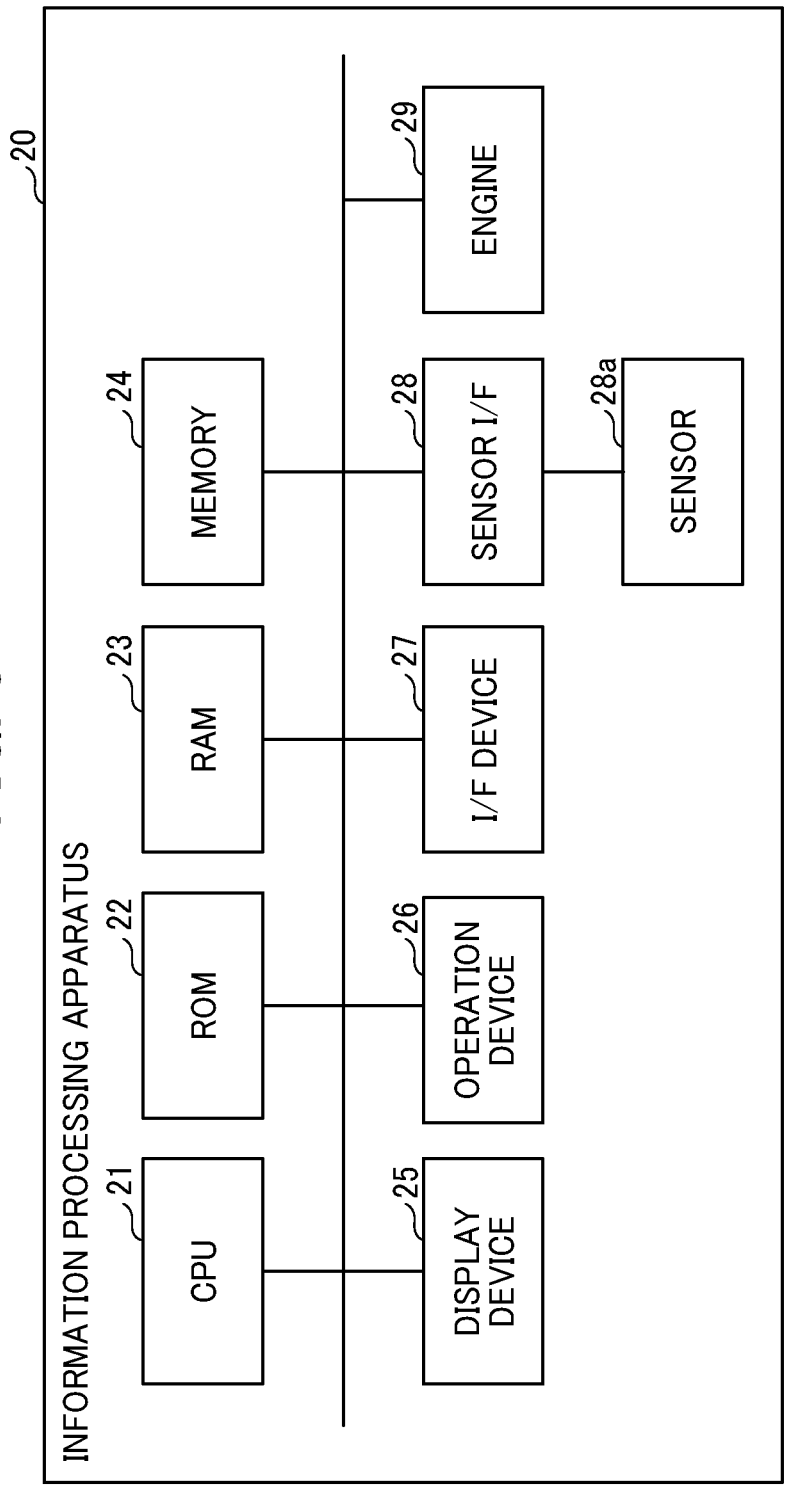
FIG. 3 is a block diagram illustrating an example of a hardware configuration of an information processing apparatus according to the first embodiment.

Hardware Configuration of Information Processing Apparatus 20:

A hardware configuration of the information processing apparatus 20 will be described. FIG. 3 is a block diagram illustrating an example of the hardware configuration of the information processing apparatus 20 according to the first embodiment. As illustrated in FIG. 3, the information processing apparatus 20 includes a CPU 21, a ROM 22, a RAM 23, a memory 24, a display device 25, an operation device 26, an I/F device 27, a sensor I/F 28, a sensor 28a, and an engine 29 as constituents. The individual constituents are connected to each other through a bus, for example, but may be connected to each other via either wired communication or wireless communication. At least one of the constituents mentioned above is optional.

Since the configurations and functions of the CPU 21, the ROM 22, the RAM 23, the memory 24, the display device 25, and the operation device 26 are substantially the same as the configurations and functions of the CPU 11, the ROM 12, the RAM 13, the memory 14, the display device 15, and the operation device 16, respectively, redundant descriptions thereof are omitted below.

Note that the I/F device 27 is a connection device for connecting the information processing apparatus 20 to the second communication network 60 and other apparatuses. The I/F device 27 is connected to the terminals 30 and other apparatuses via the second communication network 60. In addition, the I/F device 27 is connected to another apparatus via wired or wireless communication.

The engine 29 is a general name of various driving apparatuses for causing the information processing apparatus 20 to operate. The engine 29 operates under the control of the CPU 21 or the like.

The sensor 28a is a device that accepts input of user information. The sensor 28a may be a device to which identification information such as an ID and password that is an example of the user information is input. In this case, the sensor 28a may include an input device such as the one exemplified in relation to the operation device 16 and may acquire the identification information via the input device, or may acquire the identification information via the operation device 16. Alternatively, the sensor 28a may be a device that reads the identification information from a reading-target medium including the identification information of a user. It is assumed in the present embodiment that the identification information of a user includes, but not limited to, a combination of an ID of the user and a password set for the ID. In addition, it is assumed that the reading-target medium is a card-shaped medium.

The sensor 28a may read the identification information stored in the reading-target medium in any manner such as in a contact manner, in a non-contact manner, optically, or magnetically. For example, in the case where the identification information is read in a contact manner, the reading-target medium includes an IC module terminal containing the identification information, and the sensor 28a may communicate with the IC module terminal in a contact manner to read the identification information. In the case where the identification information is read in a non-contact manner, the reading-target medium includes an antenna and an IC chip containing the identification information, and the sensor 28a may read the identification information via wireless communication. In the case where the identification information is read optically, the reading-target medium includes a barcode or the like containing the identification information, and the sensor 28a may irradiate the reading-target medium with light such as infrared to read the identification information on the basis of light reflected by the barcode or the like. In the case where the identification information is read magnetically, the reading-target medium includes a magnetic tape or the like containing the identification information, and the sensor 28a may read the identification information on the basis of a change in the generated magnetic field.

The sensor I/F 28 is an interface that connects the information processing apparatus 20 to the sensor 28a.

Figure 4:
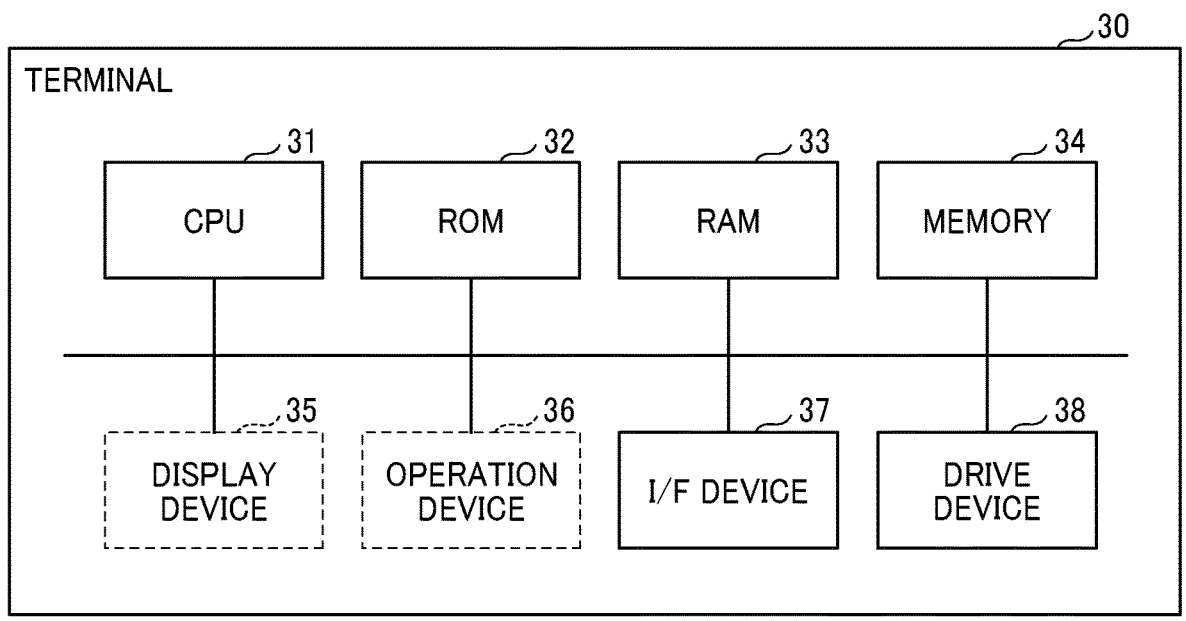
FIG. 4 is a block diagram illustrating an example of a hardware configuration of a terminal according to the first embodiment.

Hardware Configuration of Terminal 30:

A hardware configuration of the terminal 30 will be described. FIG. 4 is a block diagram illustrating an example of the hardware configuration of the terminal 30 according to the first embodiment. As illustrated in FIG. 4, the terminal 30 includes a CPU 31, a ROM 32, a RAM 33, a memory 34, a display device 35, an operation device 36, an I/F device 37, and a drive device 38 as constituents. The individual constituents are connected to each other through a bus, for example, but may be connected to each other via either wired communication or wireless communication. At least one of the constituents mentioned above is optional. For example, at least one of the display device 35 and the operation device 36 may be a device separate from the terminal 30 and may be connected to the terminal 30 with a cable or wirelessly.

Since the configurations and functions of the CPU 31, the ROM 32, the RAM 33, the memory 34, the display device 35, the operation device 36, the I/F device 37, and the drive device 38 are substantially the same as the configurations and functions of the CPU 11, the ROM 12, the RAM 13, the memory 14, the display device 15, the operation device 16, the I/F device 17, and the drive device 18, respectively, redundant description thereof are omitted below.

Note that the I/F device 37 is a connection device for connecting the terminal 30 to the second communication network 60 and other apparatuses. The I/F device 37 is connected to the information processing apparatuses 20 and other apparatuses via the second communication network 60. In addition, the I/F device 37 is connected to another apparatus via wired or wireless communication.

Figure 5:
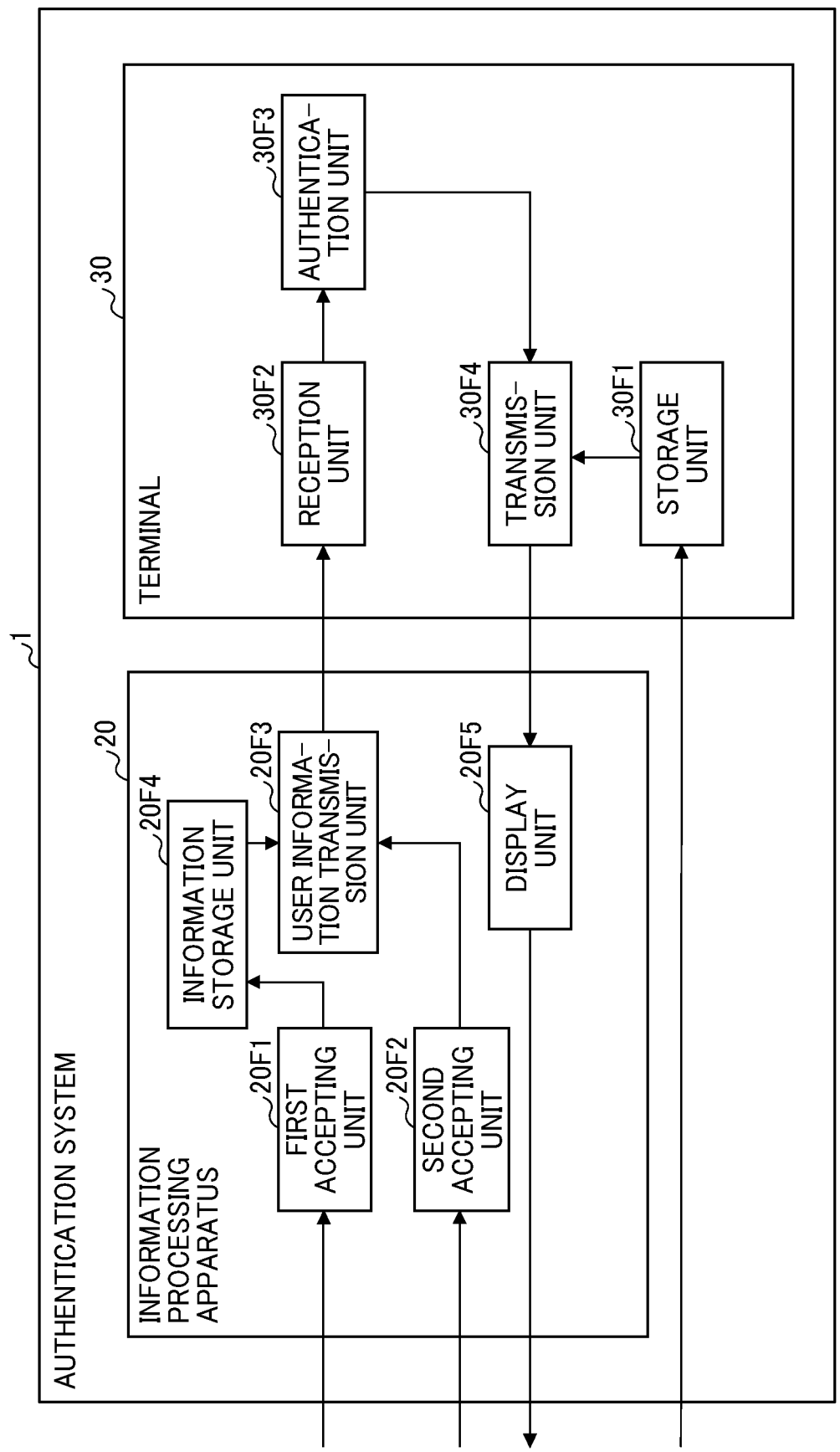
FIG. 5 is a block diagram illustrating an example of a functional configuration of the authentication system according to the first embodiment.

Example of Functional Configurations of Authentication System 1, Information Processing Apparatus 20, and Terminal 30:

FIG. 5 is a block diagram illustrating an example of a functional configuration of the authentication system 1 according to the first embodiment. As illustrated, in the authentication system 1, the information processing apparatus 20 has a following functional configuration, for example. Specifically, the information processing apparatus 20 includes a first accepting unit 20F1, a second accepting unit 20F2, and a user information transmission unit 20F3. In addition, the terminal 30 has a following functional configuration, for example. Specifically, the terminal 30 includes a storage unit 30F1, a reception unit 30F2, an authentication unit 30F3, and a transmission unit 30F4.

The information processing apparatus 20 desirably further includes an information storage unit 20F4 and a display unit 20F5. A description will be given below of the illustrated functional configuration by way of example.

The first accepting unit 20F1 performs a first accepting procedure for accepting user information for use in authentication of a user. For example, the first accepting unit 20F1 is implemented by the I/F device 27 or the like.

The second accepting unit 20F2 performs a second accepting procedure for accepting terminal information for use in identification of the terminal 30. For example, the second accepting unit 20F2 is implemented by the I/F device 27 or the like.

The user information transmission unit 20F3 performs a user information transmission procedure for identifying the terminal 30 on the basis of the terminal information accepted by the second accepting unit 20F2 and transmits user information to the terminal 30. For example, the user information transmission unit 20F3 is implemented by the CPU 21 or the like.

The information storage unit 20F4 desirably stores second user information that is different from first user information that is the user information accepted by the first accepting unit 20F1.

The second user information is a medium ID or the like and may be, for example, a unique ID assigned to an IC card, a mobile terminal, or the like.

Note that the first user information and the second user information are desirably managed in association with each other as information for identifying a user.

The user information transmission unit 20F3 transmits the first user information and the second user information. For example, the information storage unit 20F4 is implemented by the CPU 21 or the like.

The display unit 20F5 performs a display procedure for displaying job information transmitted by the transmission unit 30F4. For example, the display unit 20F5 is implemented by the display device 25 or the like.

The storage unit 30F1 performs a storage procedure for storing a job designated by a user. For example, the storage unit 30F1 is implemented by the I/F device 37 or the like.

The reception unit 30F2 performs a reception procedure for receiving the user information transmitted by the user information transmission unit 20F3. For example, the reception unit 30F2 is implemented by the CPU 31 or the like.

The authentication unit 30F3 performs an authentication procedure for performing authentication on the basis of the user information received by the reception unit 30F2. For example, the authentication unit 30F3 is implemented by the CPU 31 or the like.

The transmission unit 30F4 performs a transmission procedure for transmitting job information to the information processing apparatus 20 or the like in response to the authentication unit 30F3 authenticating a user. The job information is information regarding a job stored in the storage unit 30F1. For example, the transmission unit 30F4 is implemented by the CPU 31 or the like.

Figure 6:
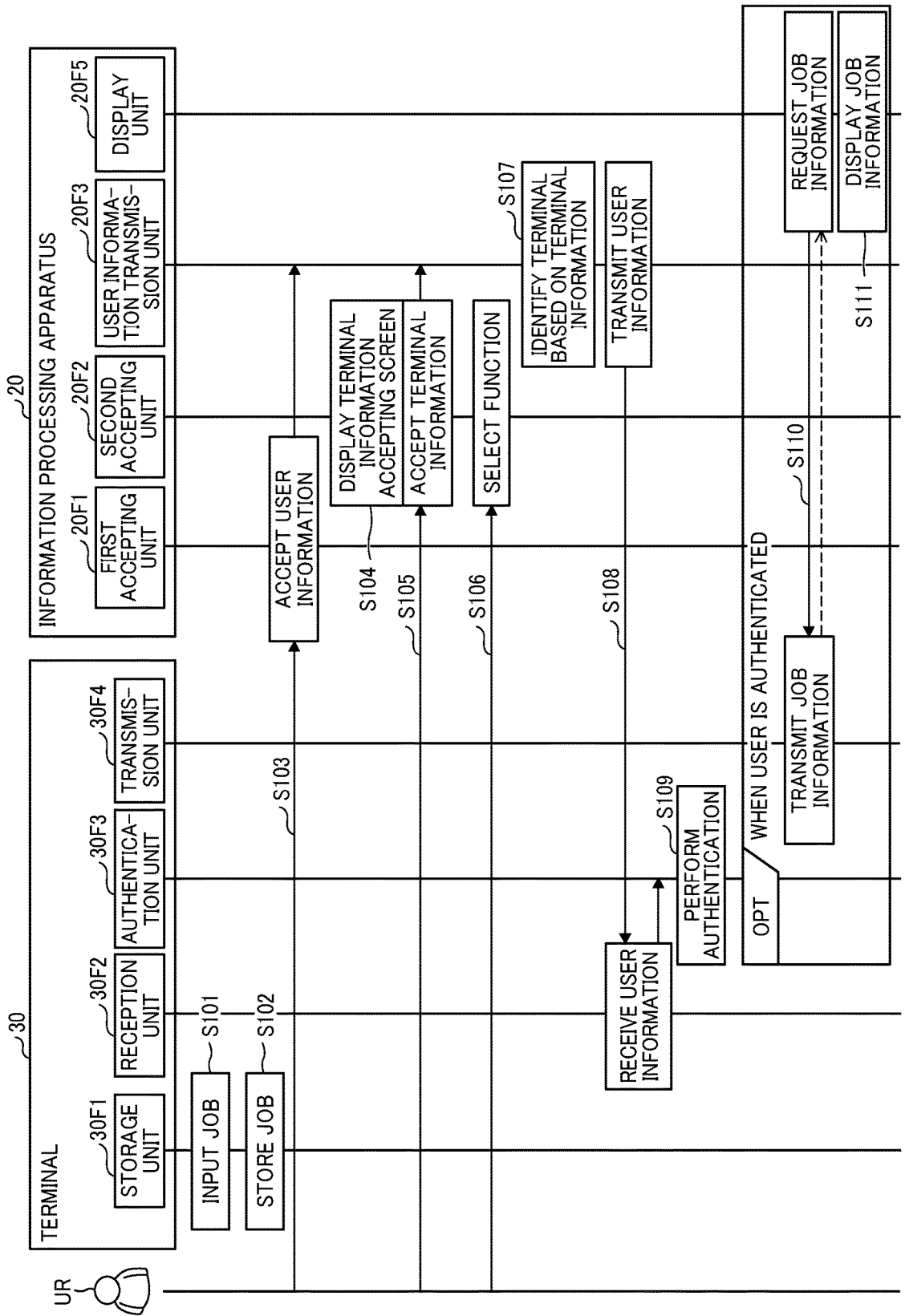
FIG. 6 is a sequence diagram illustrating a first operation example of the authentication system according to the first embodiment.

First Operation Example of Authentication System 1:

FIG. 6 is a sequence diagram illustrating a first operation example of the authentication system 1 according to the first embodiment.

In step S101, a job is input to the information processing apparatus 20. An example in which the job is a print job for performing printing will be described below. Note that the job is not limited to a print job and may be a scan job, a fax job, or the like.

For example, a print job is output by the terminal 30 or the like to the information processing apparatus 20. The information processing apparatus 20 then performs printing on a recording medium on the basis of the print job.

In step S102, the job is stored in the terminal 30.

In step S103, the first accepting unit 20F1 accepts user information. The user information is, for example, a user ID or the like that is set in advance. Note that the user information may be any information such as information with which the user is identifiable in authentication and may be information input with a card or the like, a User Principal Name (UPN), or a personal identification number (PIN) code. The user information may further include a password.

For example, the user information is accepted by the operation device 26 or the like included in the information processing apparatus 20. Specifically, the information processing apparatus 20 accepts the user information on a screen described below or the like.

FIG. 7 is a diagram illustrating an example of a screen displayed on the information processing apparatus 20 according to the first embodiment. For example, the information processing apparatus 20 displays a screen 25aa or the like. The illustrated example is an example in which "USER ID" and "USER PASSWORD" are accepted as the user information. In this example, a user UR performs an operation for entering the ID and the password on the screen 25aa and pressing a button "LOGIN".

The user information thus accepted is transmitted to the user information transmission unit 20F3.

In step S104, the second accepting unit 20F2 causes an accepting screen to be displayed in order to accept terminal information. For example, the terminal information is accepted on a screen described below.

FIG. 8 is a diagram illustrating an example of a screen displayed on the information processing apparatus 20 according to the first embodiment. For example, an ID, an Internet Protocol (IP) address, and so on of a connected external apparatus such as the terminal 30 is registered in or acquired by the information processing apparatus 20 in advance. The IDs and the IP addresses are displayed in a format of list or the like on a screen as in a screen 25ac. On the screen 25ac, "TERMINAL NAME" is the ID of each external apparatus. However, the ID is not limited to this one and may be a name or the like set for the external apparatus.

The user UR performs an operation for selecting the terminal 30 from the list displayed on the screen 25ac. For example, the terminal information is accepted through such an operation.

In step S105, the second accepting unit 20F2 accepts the terminal information. The terminal information is, for example, an IP address or the like. Note that the terminal information may be any information with which the information processing apparatus 20 can identify the terminal 30. That is, the terminal information may be an address other than the IP address, an identification number, or the like.

The terminal information thus accepted is transmitted to the user information transmission unit 20F3.

Figures 9, 10:
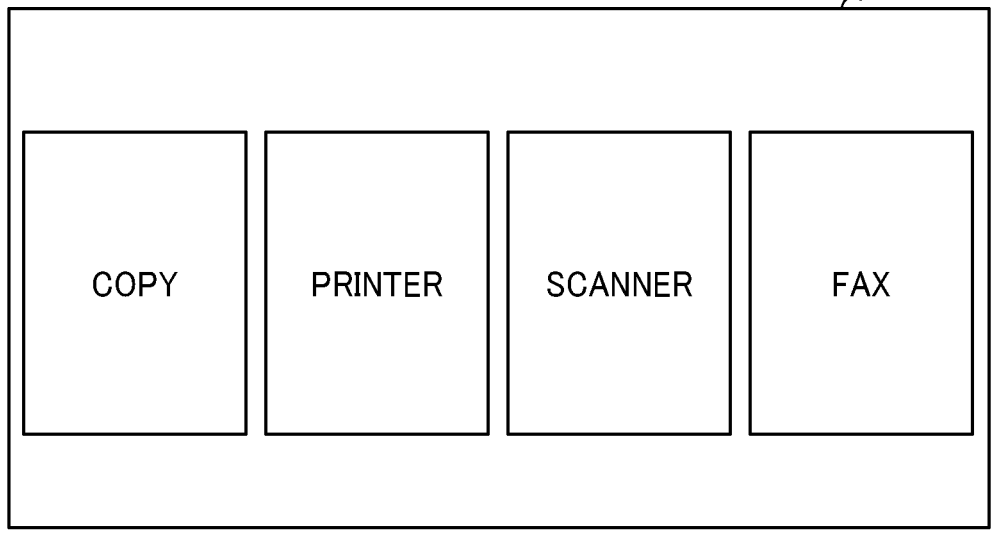
FIG. 9 is a diagram illustrating an example of a screen displayed on the information processing apparatus according to the first embodiment.
FIG. 10 is a diagram illustrating an example of a screen displayed on the information processing apparatus according to the first embodiment.
Figure 11:
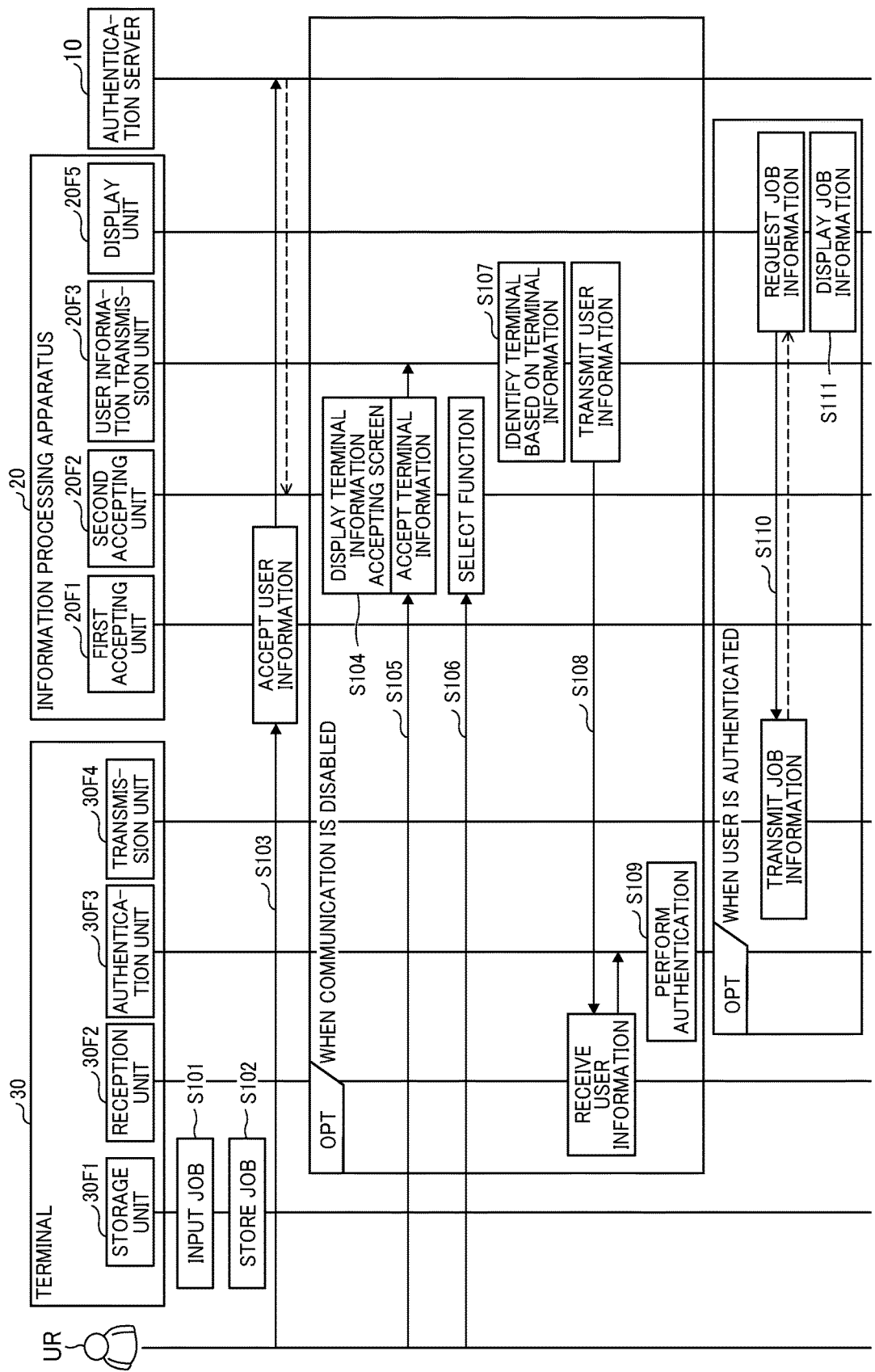
FIG. 11 is a sequence diagram illustrating a second operation example of the authentication system according to the first embodiment.

In step S106, the user UR uses the operation device 26 to select a function. At that time, the display device 25 displays a screen 25ab for requesting the user UR to enter an instruction for executing each process as illustrated in FIG. 9, for example. FIG. 9 is a diagram illustrating an example of a screen displayed on the information processing apparatus 20 according to the first embodiment. The screen 25ab is a screen that includes buttons for four processes "COPY", "PRINTER", "SCANNER", and "FAX" and requests the user UR to enter an instruction for executing one of the processes. The user UR uses the operation device 26 to press the button "PRINTER" on the screen 25ab. Consequently, the second accepting unit 20F2 or the like acquires an instruction for executing printing. Note that input of such an instruction may be omitted.

Then in step S107, the second accepting unit 20F2 or the like requests a list of print jobs stored in the storage unit 30F1.

In step S107, the user information transmission unit 20F3 identifies the terminal 30 on the basis of the terminal information. That is, the terminal 30 is identified on the basis of the IP address indicated by the terminal information, so that the information processing apparatus 20 is ready to perform communication with the terminal 30 thereafter.

In step S108, the user information transmission unit 20F3 transmits the user information to the reception unit 30F2.

The reception unit 30F2 receives the user information, and transmits the user information to the authentication unit 30F3.

In step S109, the authentication unit 30F3 performs authentication of the user UR on the basis of the user information received by the reception unit 30F2. Specifically, the authentication unit 30F3 checks whether there is an ID and password that matches the received ID and password of the user in a list set in advance or the like, for example.

If there is the matching ID and password, the authentication unit 30F3 determines that authentication is successful and authenticates the received ID and password (corresponding to "WHEN USER IS AUTHENTICATED"). On the other hand, if there is not the matching ID and password, the authentication unit 30F3 determines that authentication is not successful and does not authenticate the received ID and password.

When the authentication unit 30F3 does not authenticate the received ID and password, the authentication unit 30F3 may output an authentication result indicating unsuccessful authentication. For example, the terminal 30 may transmit an authentication result indicating unsuccessful authentication to the information processing apparatuses 20 or may cause the display device 35 to display the authentication result. In addition, the information processing apparatus 20 may cause the display device 35 to display the authentication result indicating unsuccessful authentication and to display at least one of a screen for requesting the user UR to enter the ID and password again and a screen for requesting the user UR to select the terminal name and the IP address in the list again. In addition, if the state of unsuccessful authentication is maintained after a predetermined period passes since the print job is output in step S101, the print job may be discarded.

On the other hand, if the user is authenticated ("WHEN USER IS AUTHENTICATED") in the authentication system 1, the process proceeds to step S110.

In step S110, the transmission unit 30F4 transmits job information in response to a request for job information from the information processing apparatus 20. The job information is, for example, a job list or the like. Note that step S110 may be performed simultaneously with a request for user authentication (step S107), for example.

The job information is information for use mainly in displaying a job list. Specifically, the job information is, for example, information on the output date and time, the title of a document that is the target of the print job, the number of recording media subjected to printing, the format of a file used in the print job, or a setting of color or monochrome printing, or a combination of these pieces of information. Accordingly, the job information is so-called bibliographic information or the like.

In step S111, the display unit 20F5 desirably displays the job information transmitted from the terminal 30. For example, a screen described below is desirably displayed.

FIG. 10 is a diagram illustrating an example of a screen displayed on the information processing apparatus 20 according to the first embodiment. For example, as illustrated, a screen 25ad displays pairs of the ID of each print job and the name of to-be-processed data. The user UR uses the operation device 26 to select the ID of the print job or the name of the to-be-processed data for which the user UR requests printing by pressing or the like, for example, on the screen 25ad. The print job for which printing is requested is the print job that is output in step S101 and that sets the information processing apparatus 20 as a target of the printing process.

Through the operation described above, the information processing apparatus 20 can transmit the user information to the terminal 30 identified by the terminal information.

When the terminal 30 includes the authentication unit 30F3, authentication of a user can be performed on the basis of the user information in the terminal 30, that is, a terminal that requests printing.

Note that the job may include a processing job for performing a printing process.

Second Operation Example of Authentication System 1:

A second operation example differs from the first operation example in that authentication is attempted by the authentication server 10 first. Differences from FIG. 6 will be mainly described below to omit a duplicate description.

Unlike the first operation example, the first accepting unit 20F1 transmits user information to the authentication server 10 in response to acceptance of the user information to cause the authentication server 10 to perform authentication.

For example, when a network or the like is disconnected or the authentication server 10 is powered off, it is determined that the information processing apparatus 20 is unable to communicate with the authentication server 10 ("WHEN COMMUNICATION IS DISABLED").

If authentication by the authentication server 10 or the like is not available, the process proceeds to step S104. Thereafter, authentication is performed by the terminal 30 in the authentication system 1 as in the first operation example.

Note that examples of the case where authentication by the authentication server 10 is not available include a case where communication is disabled because of a communication failure or because the authentication server 10 is down, a case where authentication data is not accessible because of a problem in the authentication server 10, and the case where the authentication data is deleted, for example.

If the user UR is authenticated by the authentication server 10 or the terminal 30, processing of step S110 and subsequent step is performed.

As described above, if the terminal 30 performs authentication when authentication by the authentication server 10 or the like is not available because of a communication failure or the like, it is possible to prevent a job from being halted because authentication is not available, for example.

Note that a setting may be made so that authentication is performed preferentially by the terminal 30.

Figure 12:
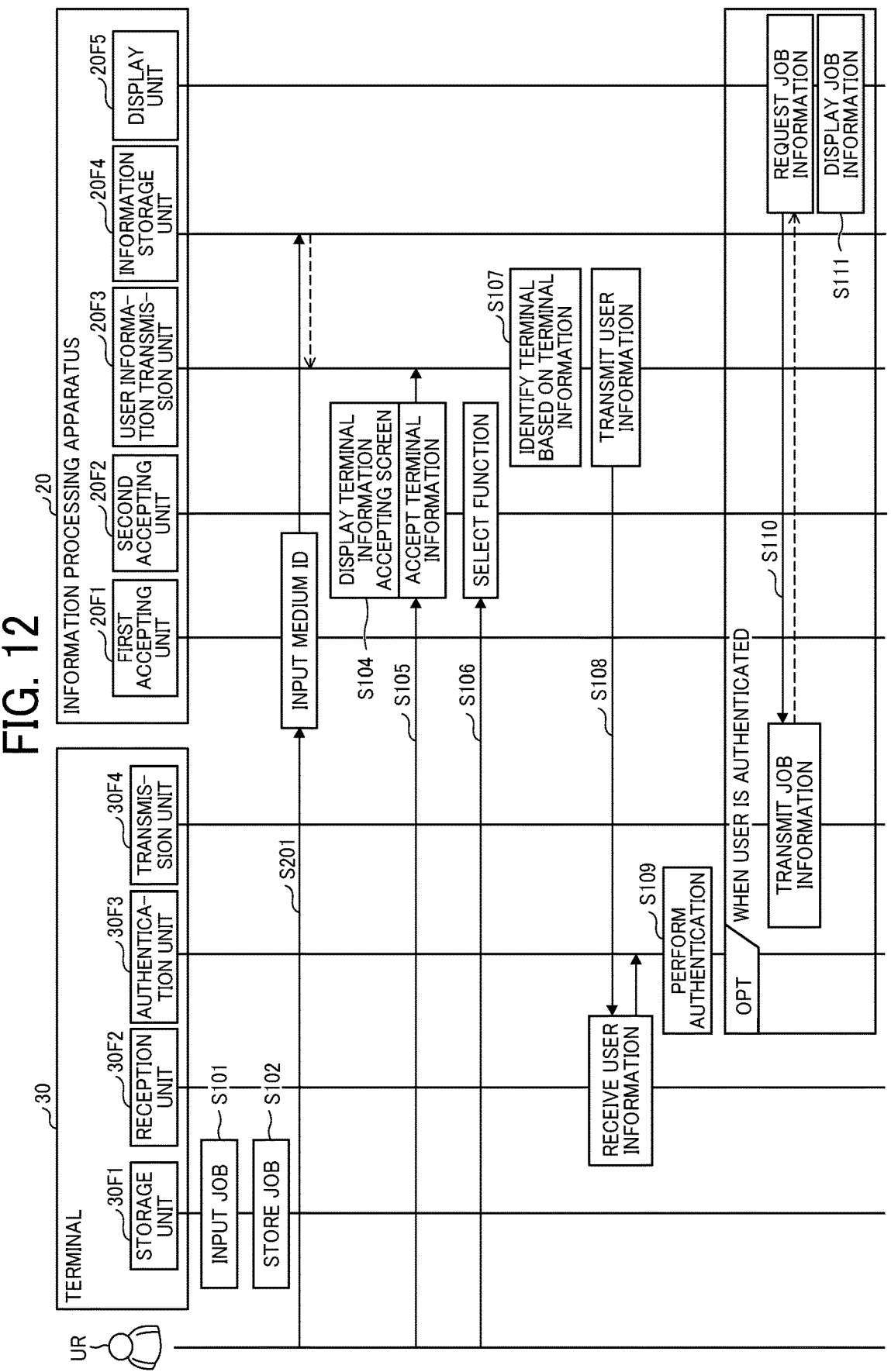
FIG. 12 is a sequence diagram illustrating a variation of the first operation example of the authentication system according to the first embodiment.

Variation of First Embodiment:

FIG. 12 is a sequence diagram illustrating a variation of the first operation example of the authentication system 1 according to the first embodiment. Differences from FIG. 6 will be mainly described below. The illustrated operation example differs from the operation example illustrated in FIG. 6 in step S201. In addition, as illustrated, the variation uses the information storage unit 20F4.

In step S201, the first accepting unit 20F1 accepts a medium ID or the like. For example, the first accepting unit 20F1 causes the sensor 28a to read the medium ID stored in a reading-target medium to accept the medium ID. For example, the user may place the reading-target medium over the sensor 28a to cause the sensor 28a to read the medium ID. Consequently, the first accepting unit 20F1 of the information processing apparatus 20 acquires the medium ID.

The information storage unit 20F4 stores the ID and password of the user and the medium ID in relation to, that is, in association with each other. Note that the medium ID may be the same as or different from the ID of the user.

Thus, after the above-described associating the medium ID and the user ID and password, in response to acquisition of the medium ID, the authentication system 1 searches the information storage unit 20F4 for the ID and password associated with the medium ID, and therefore the ID and password of the user can be acquired without requesting the user for the ID and password as in step S103.

Note that the ID and password or the like may be further requested as in step S103 even if the medium ID is input. A configuration may be made so that the ID or the like is checked multiple times in this way to enhance the security.

The authentication system according to the variation described above provides substantially the same advantageous effects as the authentication system 1 according to the first embodiment.

As described above, inputting of a medium ID can save the user UR an operation for inputting user information such as an ID and password.

Second Embodiment

In the first embodiment, in response to a terminal outputting a print job to an information processing apparatus, the print job is temporarily held by the terminal. In a second embodiment, a print job output by a terminal is temporarily held by a data server. The data server outputs the held print job in response to a request from an information processing apparatus. Differences of the second embodiment from the first embodiment and the modification of the first embodiment will be mainly described below to appropriately omit a description of similarities to the first embodiment and the variation of the first embodiment.

Figure 13:
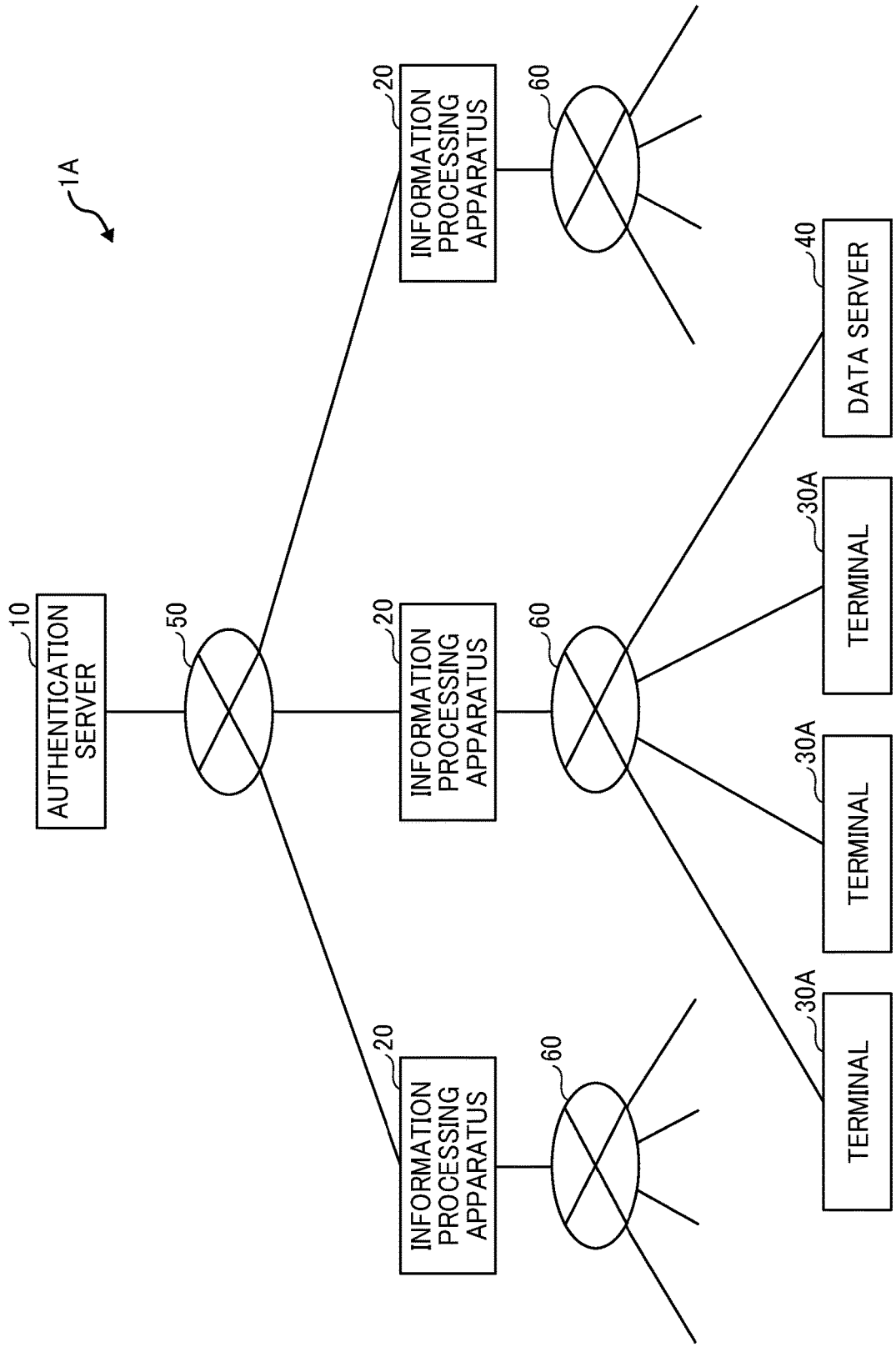
FIG. 13 is a diagram illustrating an example of a configuration of an authentication system according to a second embodiment.

Configuration:

A configuration of an authentication system 1A according to the second embodiment will be described. FIG. 13 is a diagram illustrating an example of the configuration of the authentication system 1A according to the second embodiment. As illustrated in FIG. 13, the authentication system 1A includes an authentication server 10, information processing apparatuses 20, terminals 30A, and a data server 40 which is an example of a data storage apparatus. The authentication system 1A may include one or more authentication servers 10, one or more information processing apparatuses 20, one or more terminals 30A, and one or more data servers 40. One or more information processing apparatuses 20 may be deployed for a single authentication server 10, and one or more terminals 30A and one or more data servers 40 may be deployed for a single information processing apparatus 20. The authentication server 10 and the information processing apparatuses 20 have substantially the same configurations as those described in the first embodiment.

The authentication server 10 and the information processing apparatuses 20 communicate with each other via a first communication network 50. The information processing apparatuses 20, the terminals 30A, and the data server 40 communicate with each other via a second communication network 60. The first communication network 50 and the second communication network 60 are different communication networks but may be the same communication network.

The data server 40 is an apparatus that has a communication function and that processes information. The data server 40 manages print jobs output from the terminals 30A. Specifically, the data server 40 manages print jobs for the one or more terminals 30A connected to the second communication network 60 to which the data server 40 is connected. The data server 40 may manage print jobs for all or some of the terminals 30A connected to the second communication network 60. Since the data server 40 has substantially the same hardware configuration as the authentication server 10, a redundant description of the hardware configuration is omitted below.

Figure 14:
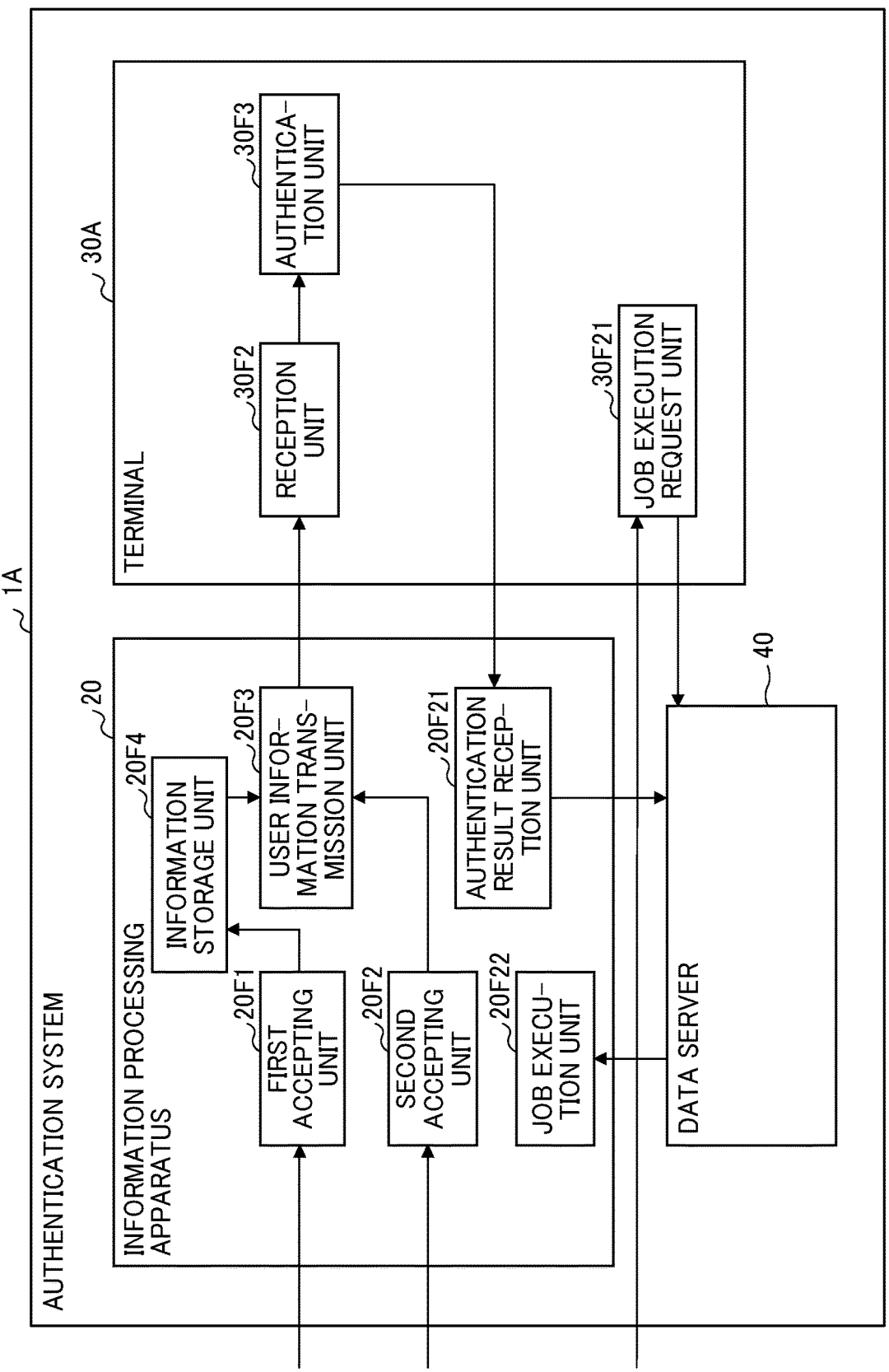
FIG. 14 is a block diagram illustrating an example of a functional configuration of the authentication system according to the second embodiment.

FIG. 14 is a block diagram illustrating an example of a functional configuration of the authentication system 1A according to the second embodiment. The authentication system 1A differs from the authentication system 1 according to the first embodiment in that the authentication system 1A includes the data server 40. The information processing apparatus 20 according to the second embodiment differs from that of the first embodiment in that the information processing apparatus 20 according to the second embodiment includes an authentication result reception unit 20F21 and a job execution unit 20F22. The terminal 30A according to the second embodiment differs from the terminal 30 according to the first embodiment in that the terminal 30A according to the second embodiment includes a job execution request unit 30F21. Differences will be mainly described below to omit a duplicate description.

The job execution request unit 30F21 performs a job execution requesting procedure for requesting the data server 40 to execute a job. For example, the job execution request unit 30F21 is implemented by the CPU 31 or the like.

The authentication result reception unit 20F21 performs an authentication result reception procedure for receiving an authentication result obtained by the terminal 30A. For example, the authentication result reception unit 20F21 is implemented by the CPU 21 or the like.

The job execution unit 20F22 performs a job execution procedure for executing a job on the basis of the job acquired from the data server 40. For example, the job execution unit 20F22 is implemented by the CPU 21 or the like.

Figure 15:
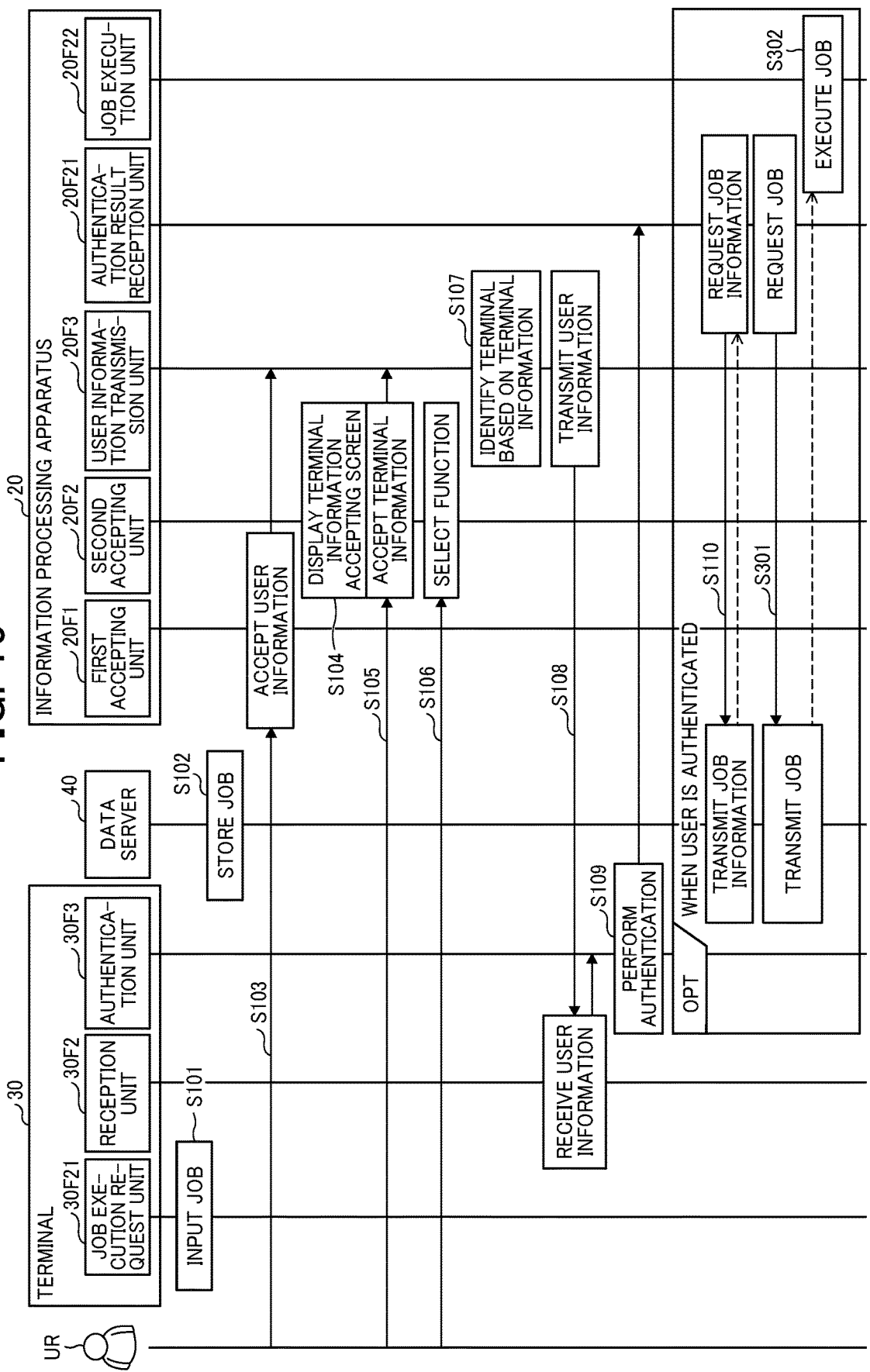
FIG. 15 is a sequence diagram illustrating a first operation example of the authentication system according to the second embodiment.

Operation:

FIG. 15 is a sequence diagram illustrating a first operation example of the authentication system 1A according to the second embodiment. Differences from the first embodiment will be mainly described below.

In the illustrated example, the job input in step S101 is stored by the data server 40 in step S102.

For example, authentication is performed as in the first embodiment. The authentication unit 30F3 then transmits an authentication result to the authentication result reception unit 20F21. If the authentication result indicates that the user is authenticated, step S110 and steps S301 and S302 are performed.

In step S110, the job execution unit 20F22 desirably transmits a job information request to the data server 40. In response to the job information request, for example, the data server 40 transmits the job information. Note that the job information may be transmitted together with the job unlike the illustrated case. For example, the job information may be included in the job and be transmitted. That is, the job information may be transmitted in step S301.

If the user is authenticated ("WHEN USER IS AUTHENTICATED"), the authentication result reception unit 20F21 acquires the job from the data server 40 in step S301. Specifically, the data server 40 transmits the job to the information processing apparatus 20 on the basis of the request.

In step S302, the job execution unit 20F22 executes the acquired job.

The authentication system 1A according to the second embodiment described provides substantially the same advantageous effects as the authentication system 1 according to the first embodiment.

That is, the authentication system 1 may include a data storage apparatus such as the data server 40.

In the configuration described above, the job is held in the data server 40 until the job is executed after authentication is finished. Consequently, a decrease in the processing performance and the shortage of the storage area of the terminal 30A that may occur as a result of the terminal 30A holding jobs are suppressed. In such a configuration, authentication is desirably performed by the terminal 30, that is, a terminal that requests printing. That is, if authentication stops because of a communication failure or the like, the job request or the like is halted and the job is not executed in many cases even in such a configuration. If the terminal 30 is capable of performing authentication, a frequency with which the job is not executed can be reduced.

Regarding Job, Print Job, and Job Information:

The job is not limited to a print job used in the example above. That is, the job may be a job for executing another function. A print job is a job for executing printing. The job may be a job for a copier, a printer, a scanner, a fax, or the like.

In addition, job information is, for example, bibliographic information regarding a job and may be included in the job.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

For example, in the authentication systems according to the embodiments and the variations, the sensor 28a reads identification information held by a reading-target medium and authentication is performed using the read identification. However, the configuration is not limited to this one. For example, the sensor 28a may be a camera that captures an image of the iris of a user's eye, an infrared camera that captures an image of the retina of a user's eye, a camera that captures an image of a user's face, a fingerprint sensor that reads a user's fingerprint, or a microphone that captures a user's voice, for example. The image of the iris, the image of the retina, the image of the face, the image of the fingerprint, or the audio signal may be used in authentication as identification information.

In addition, the present disclosure may be implemented by a program and a computer-readable recording medium storing the program thereon. Needless to say, the program can be distributed via a transmission medium such as the Internet.

The program is a program causing a computer of the authentication system or the like to carry out an authentication method. Therefore, once the program is executed, pieces of hardware such as a processing device, a control device, and a storage device included in the computer operate in cooperation with one another to carry out the authentication method.

All the numbers such as ordinal numbers and quantities used in the above description are exemplified to specifically describe the technique of the present disclosure, and the present disclosure is not limited to the exemplified numbers. In addition, connection relationships between the constituents are exemplified to specifically describe the technique of the present disclosure, and the connection relationships that implement the functions of the present disclosure are not limited to these connection relationships.

Further, division of blocks in the functional block diagrams are an example. A plurality of blocks may be implemented as a single block, a single block may be divided into a plurality of blocks, and/or part of a function may be transferred to another block. In addition, functions of a plurality of blocks having similar functions may be processed by a single piece of hardware or software in parallel or in a time division manner.

The printing system according to the related art acquires output data from the corresponding client terminal even if authentication of the user using the server apparatus is not available. At that time, the printing system uses information accumulated in the cache unit. However, the cache unit has limitations regarding an information accumulation period and size of accumulated information. For this reason, for example, information corresponding to a user who uses the printing system with a low frequency may no longer remain in the cache unit when the information is required. Therefore, authentication of the user may fail when authentication of the user using the server apparatus is not available. If authentication of the user fails, for example, execution of a job is not permitted in many cases.

According to one or more embodiments of the present disclosure, a client terminal that requests execution of a job such as printing can perform authentication of a user.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An authentication system comprising:
a terminal; and
an information processing apparatus communicable with the terminal via a network, the authentication system being configured to perform authentication of a user who operates the information processing apparatus, wherein
the information processing apparatus includes one or more first processors configured to:
accept user information for use in authentication of the user;
accept terminal information for use in identification of the terminal; and
identify the terminal based on the terminal information, to transmit the user information to the terminal, and
the terminal includes one or more second processors configured to:
store a job designated by the user;
receive the user information from the information processing apparatus; and
perform authentication of the user based on the user information received.

2. The authentication system according to claim 1, wherein
the one or more second processors of the terminal are further configured to transmit job information regarding the job to the information processing apparatus when the authentication performed by the one or more second processors based on the user information received from the information processing apparatus is successful.

3. The authentication system according to claim 2, further comprising:
an authentication apparatus communicable with the information processing apparatus via a network, the authentication apparatus being configured to perform authentication of the user based on the user information,
wherein when user authentication performed by the authentication apparatus is unavailable,
the one or more first processors of the information processing apparatus transmits the user information to the terminal.

4. The authentication system according to claim 2, wherein
the information processing apparatus further includes a display configured to display the job information.

5. An authentication system comprising:
a terminal;
an information processing apparatus communicable with the terminal; and
a data storage apparatus communicable with the terminal and the information processing apparatus,
the authentication system being configured to perform authentication of a user who operates the information processing apparatus,
wherein the information processing apparatus includes one or more first processors configured to:
accept user information for use in authentication of the user;
accept terminal information for use in identification of the terminal;
identify the terminal based on the terminal information, to transmit the user information to the terminal; and
receive a result of authentication of the user performed by the terminal,
wherein the terminal includes one or more second processors configured to:
receive the user information;
perform authentication of the user based on the user information;
transmit the result of authentication to the information processing apparatus; and
request the data storage apparatus to execute a job, and
wherein the information processing apparatus acquires the job from the data storage apparatus in response to the result of authentication indicating successful authentication of the user.

6. The authentication system according to claim 1, wherein
the job includes to-be-processed data used by the information processing apparatus to execute the job.

7. The authentication system according to claim 5, wherein
the job includes to-be-processed data used by the information processing apparatus to execute the job.

8. The authentication system according to claim 6, wherein the information processing apparatus is an image forming apparatus, and
wherein the job includes print data.

9. The authentication system according to claim 1, wherein
the information processing apparatus further comprises a memory configured to store second user information in association with first user information, the first user information being the user information, the second user information being different from the first user information,
in response to accepting the first user information by the one or more first processors, the information processing apparatus identifies the second user information based on the first user information, and
the one or more first processors of the information processing apparatus are further configured to transmit the first user information and the second user information, as the user information.

10. The authentication system according to claim 5, wherein
the information processing apparatus further comprises a memory configured to store second user information in association with first user information, the first user information being the user information, the second user information being different from the first user information,
in response to accepting the first user information by the one or more first processors, the information processing apparatus identifies the second user information based on the first user information, and
the one or more first processors of the information processing apparatus are further configured to transmit the first user information and the second user information, as the user information.

11. A terminal communicable with an information processing apparatus via a network, the information processing apparatus including one or more first processors configured to: accept user information for use in authentication of a user; accept terminal information for use in identification of the terminal; and identify the terminal based on the terminal information to transmit the user information to the terminal,
the terminal comprising one or more second processors configured to:
store a job designated by the user;
receive the user information from the information processing apparatus; and
perform authentication of the user based on the user information received.

12. An authentication method performed by an authentication system including a terminal and an information processing apparatus communicable with the terminal via a network and being configured to perform authentication of a user who operates the information processing apparatus, the authentication method comprising:
accepting, by the information processing apparatus, user information for use in authentication of the user;
accepting, by the information processing apparatus, terminal information for use in identification of the terminal;
identifying, by the information processing apparatus, the terminal based on the terminal information, to transmit the user information to the terminal;
storing, by the terminal, a job designated by the user;
receiving, by the terminal, the user information from the information processing apparatus; and
performing, by the terminal, authentication of the user based on the user information received.

13. A non-transitory computer-readable medium storing a program for causing an authentication system to perform an authentication method, the authentication system including a terminal and an information processing apparatus communicable with the terminal via a network and being configured to perform authentication of a user who operates the information processing apparatus, the authentication method comprising:
accepting, by the information processing apparatus, user information for use in authentication of the user;

accepting, by the information processing apparatus, terminal information for use in identification of the terminal;
identifying, by the information processing apparatus, the terminal based on the terminal information, to transmit the user information to the terminal;
storing, by the terminal, a job designated by the user;
receiving, by the terminal, the user information from the information processing apparatus; and
performing, by the terminal, authentication of the user based on the user information received.

\* \* \* \* \*